No. 800,809. PATENTED OCT. 3, 1905.
T. H. LINDLEY.
PNEUMATIC TIRE GUARD.
APPLICATION FILED JAN. 3, 1905.

Witnesses
F. J. Kubicek
S. M. Langworthy

Inventor
Thomas H. Lindley
By Justin M. St. John
Atty.

UNITED STATES PATENT OFFICE.

THOMAS H. LINDLEY, OF CEDAR RAPIDS, IOWA.

PNEUMATIC-TIRE GUARD.

No. 800,809.          Specification of Letters Patent.          Patented Oct. 3, 1905.

Application filed January 3, 1905. Serial No. 239,514.

*To all whom it may concern:*

Be it known that I, THOMAS H. LINDLEY, a citizen of the United States, residing at Cedar Rapids, in the county of Linn and State of Iowa, have invented certain new and useful Improvements in Pneumatic-Tire Guards, of which the following is a specification.

This invention relates to pneumatic tires for vehicles, more particularly automobiles; and the object of the invention is to protect such tires from puncture, as well as from the wear incident to travel over rough and stony roads.

The invention is simple in its nature and will clearly appear from the description and claims following, reference being had to the accompanying drawings, in which—

Figure 1:
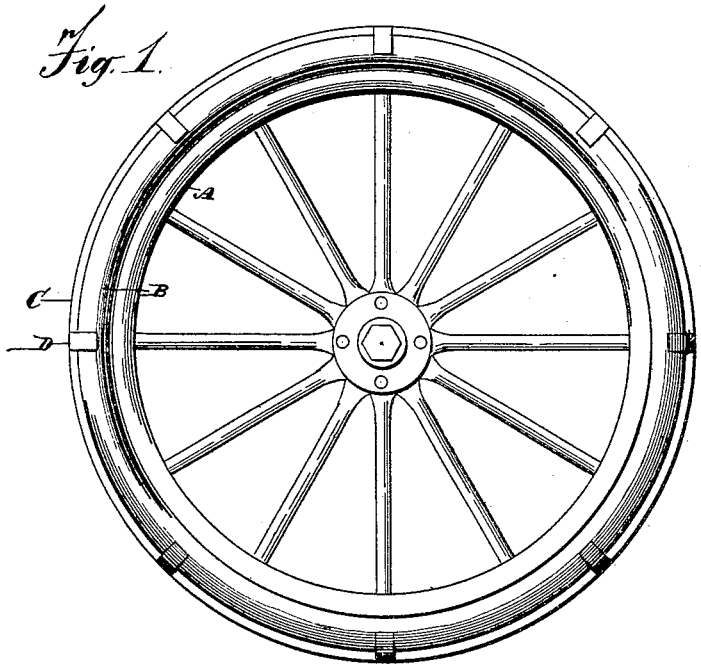
Figure 2:
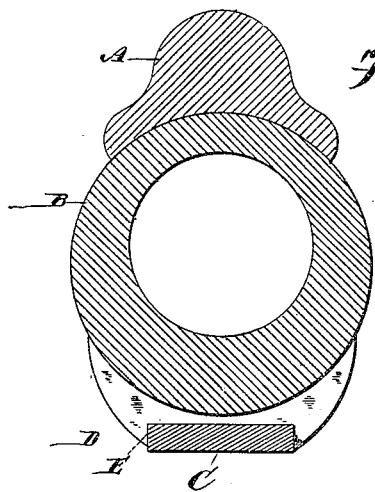

Figure 1 is a side view of an automobile-wheel with my improved tire-guard attached. Fig. 2 is a cross-section of a single-tube tire and the guard, one of the saddles being shown in full.

In the drawings, A designates a wheel-rim or felly, to which is attached in the usual way a tire B, in this case shown as one of the single-tube type, though the device is applicable to any variety of pneumatic tire.

The invention comprises a metal band C, continuous and closely encircling the tire, and a number of interposed keepers or saddles D, notched or recessed at E to take the band and with inner faces conforming to the curve of the tire in cross-section. In practice a flat band is preferred, in which case the saddle will be quite thin at the middle, as shown, but still thick enough to do all that is required of it, which is merely to keep the band in position central to the tire. In effect this thickness disappears when the guard is in position, the band hugging the periphery of the tire tightly all around and the saddles sinking into the soft material thereof sufficiently to admit of such close contact.

When it may be necessary to remove the guard for any purpose, it is quickly done by deflating the tire, when the guard may be forced off it sidewise.

The band is preferably not fastened to the saddles, as experience shows that there is a tendency of the band to creep around the tire at the rate of a fraction of an inch to the mile of travel. To prevent this would result in a broken band or a worn or torn tire, so this peculiar action is allowed to take place in its own natural way, the band sliding imperceptibly in the recesses of the saddles and without injury to any part or diminution of traction on the part of the wheel.

The width or thickness of the band may be such as the circumstances in each case may require. In the case of a two-and-one-half-inch tire a band about an inch wide and five-sixteenths of an inch thick has given excellent results.

The guard gives a slight increase in vibration; but this is more than compensated for by the immunity it affords the tire from punctures and other injuries.

Having thus described my invention, what I claim as new, and desire to secure by Letters Patent, is—

1. A guard for pneumatic tires, comprising a continuous metal band closely encircling the tire centrally, and keepers recessed outwardly to take said band, and inwardly conforming to the periphery of the tire in cross-section.

2. A guard for pneumatic tires, comprising a continuous metal band closely encircling the tire centrally, and keepers fitting over the periphery of the tire crosswise, and recessed on the outer side to take the band and allow it to slip therein.

In testimony whereof I affix my signature in presence of two witnesses.

THOMAS H. LINDLEY.

Witnesses:
     J. M. ST. JOHN,
     F. J. KUBICEK.